United States Patent
Setlur et al.

(10) Patent No.: US 7,391,148 B1
(45) Date of Patent: Jun. 24, 2008

(54) PHOSPHOR BLENDS FOR HIGH-CRI FLUORESCENT LAMPS

(75) Inventors: Anant Achyut Setlur, Niskayuna, NY (US); Alok Mani Srivastava, Niskayuna, NY (US); Holly Ann Comanzo, Niskayuna, NY (US); Venkatesan Manivannan, Clifton Park, NY (US); William Winder Beers, Chesterland, OH (US); Katalin Toth, Pomaz (HU); Laszlo D. Balazs, Budapest (HU)

(73) Assignee: General Electric Company, Niskayuna, NY (US)

( * ) Notice: Subject to any disclaimer, the term of this patent is extended or adjusted under 35 U.S.C. 154(b) by 662 days.

(21) Appl. No.: 10/064,129

(22) Filed: Jun. 13, 2002

(51) Int. Cl.
 *H01J 1/62* (2006.01)
(52) U.S. Cl. .................. 313/486; 313/501
(58) Field of Classification Search .............. 313/501
 See application file for complete search history.

(56) References Cited

U.S. PATENT DOCUMENTS

| | | | |
|---|---|---|---|
| 4,038,204 A * | 7/1977 | Wachtel | 252/301.4 P |
| 5,122,710 A | 6/1992 | Northrop et al. | |
| 5,471,113 A * | 11/1995 | De Backer et al. | 313/487 |
| 5,612,590 A | 3/1997 | Trushell et al. | |
| 5,808,409 A * | 9/1998 | Matsuda et al. | 313/486 |
| 6,137,217 A | 10/2000 | Pappalardo et al. | |
| 6,153,971 A * | 11/2000 | Shimizu et al. | 313/486 |
| 6,187,225 B1 | 2/2001 | Rao | |
| 6,294,800 B1 * | 9/2001 | Duggal et al. | 257/89 |
| 6,580,097 B1 * | 6/2003 | Soules et al. | 275/100 |
| 6,685,852 B2 * | 2/2004 | Setlur et al. | 252/301.4 R |
| 2002/0008462 A1 * | 1/2002 | Juestel et al. | 313/485 |
| 2002/0158565 A1 | 10/2002 | Setlur et al. | |
| 2003/0067008 A1 | 4/2003 | Srivastava et al. | |

FOREIGN PATENT DOCUMENTS

| | | |
|---|---|---|
| EP | 0594424 | 12/1998 |
| EP | 1339093 | 8/2003 |
| WO | 0189001 | 11/2001 |

OTHER PUBLICATIONS

Shigeo Shionoya and William M. Yen (Ed.), "Phosphor Handbook," pp. 367-444, CRC Press, Boca Raton, Florida (1999).
G. Blasse and B.C. Grabmaier, "Luminescent Materials," pp. 108-133, Springer-Verlag, Berlin, Germany (1994).

* cited by examiner

*Primary Examiner*—Vip Patel
(74) *Attorney, Agent, or Firm*—Paul J. DiConza; William E. Powell, III

(57) ABSTRACT

A phosphor blend comprises at least two phosphors each selected from one of the groups of phosphors that absorb UV electromagnetic radiation and emit in a region of visible light. The phosphor blend can be applied to a discharge gas radiation source to produce light sources having high color rendering index. A phosphor blend is advantageously includes the phosphor $(Tb,Y,LuLa,Gd)_x(Al,Ga)_yO_{12}:Ce^{3+}$, wherein x is in the range from about 2.8 to and including 3 and y is in the range from about 4 to and including 5.

18 Claims, 14 Drawing Sheets

PHOSPHOR BLENDS FOR HIGH-CRI FLUORESCENT LAMPS

FEDERAL RESEARCH STATEMENT

This invention was first conceived or reduced to practice in the performance of work under contract DE-FC26-99FT40632 awarded by the United States Department of Energy. The United States of America may have certain rights to this invention.

BACKGROUND OF INVENTION

The present invention relates to phosphor blends for use in discharge lamps. In particular, the present invention relates to phosphor blends useful for achieving high color rendering index ("CRI") in mercury discharge lamps. The present invention also relates to high-CRI fluorescent lamps.

A phosphor is a luminescent material that absorbs radiation energy in a portion of the electromagnetic spectrum and emits energy in another portion of the electromagnetic spectrum. Phosphors of one important class are crystalline inorganic compounds of very high chemical purity and of controlled composition to which small quantities of other elements (called "activators") have been added to convert them into efficient fluorescent materials. With the right combination of activators and host inorganic compounds, the color of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert the ultraviolet ("UV") radiation emitted by the excited mercury vapor to visible light. Other phosphors are capable of emitting visible light upon being excited by electrons (used in cathode ray tubes) or X rays (for example, scintillators in X-ray detection systems).

The efficiency of a lighting device that uses a phosphor increases as the difference between the wavelengths of the exciting radiation and that of the emitted radiation narrows. In low-pressure mercury discharge lamps (also commonly known as fluorescent lamps), excited mercury atoms in the discharge, upon returning to the ground state, mainly emit UV radiation having wavelength of 254 nm (about 12% of the emitted radiation having wavelength of 185 nm). Ideal phosphor for mercury discharge lamps should absorb the 254 nm and 185 nm strongly and convert the absorbed radiation efficiently. Effort, therefore, has been expended to produce phosphors for these lamps to be excited by radiation having wavelengths as close to 254 nm as possible. Three or four phosphors are typically included in a low-pressure mercury discharge lamp to provide white light that simulates sunlight. Different blends of phosphors can produce fluorescent lamps with different color temperatures. The color temperature of a light source refers to the temperatures of a blackbody source having the closest color match to the light source in question. The color match is typically represented and compared on a conventional CIE (Commission International as l'Eclairage) chromaticity diagram. See, for example, "Encyclopedia of Physical Science and Technology," Vol. 7, 230-231 (Robert A. Meyers (Ed.), 1987). Generally, as the color temperature increases, the light becomes bluer. As the color temperature decreases, the light appears redder. Typical incandescent lamps have color temperature of about 2700 K while fluorescent lamps have color temperature in the range of 3000-6500 K. When the point representing the light source is not exactly on the black body locus of the CIE chromaticity diagram, the light source has a correlated color temperature, which is the temperature on the black body locus which would give nearly the same color to the average human eye.

In addition to color temperature, color rendering index ("CRI") is another important characteristic of the light source. CRI is a measure of the degree of distortion in the apparent colors of a set of standard pigments when measured with the light source in question as opposed to a standard light source. CRI depends on the spectral energy distribution of the emitted light and can be determined by calculating the color shift; e.g., quantified as tristimulus values, produced by the light source in question as opposed to the standard light source. Under illumination with a lamp with low CRI, an object does not appear natural to the human eye. Thus, the better light sources have CRI close to 100. Typically, for color temperatures below 5000 K, the standard light source used is a blackbody of the appropriate temperature. For color temperatures greater than 5000 K, sunlight is typically used as the standard light source. Light sources having a relatively continuous output spectrum, such as incandescent lamps; typically have a high CRI; e.g., equal to or near 100. Light sources having a multi-line output spectrum, such as high pressure discharge lamps, typically have a CRI ranging from about 50 to 80. Fluorescent lamps typically have a CRI in the range of 75-85. Typically, fluorescent lamps have higher color temperature, but lower CRI than incandescent lamps. In general lighting applications, it is desirable to provide light sources having color temperature in the range of 4000-6000 K; i.e., in the range of color temperature of fluorescent lamps. Thus, it is very desirable to provide fluorescent lamps that have higher CRIs and still maintain higher color temperature than that of typical incandescent lamps. In addition, there is a continued need to provide phosphor compositions that are excitable in the region near 254 nm and emit in the visible range such that they may be used flexibly to design light sources having tunable properties, such as color temperatures and CRI.

SUMMARY OF INVENTION

The present invention provides phosphor blends that are excitable by electromagnetic ("EM") radiation having wavelengths in the range from about 200 nm to about 400 nm to emit efficiently a visible light in a range of wavelengths from about 490 nm to about 770 nm. A phosphor blend of the present invention comprises a mixture of at least two phosphors, each selected from one of the groups: (a) $(Ba,Sr,Ca)_5(PO_4)_3(Cl,F,OH):Eu^{2+}$, $(Ba,Sr,Ca)MgAl_{10}O_{17}:Eu^{2+}$, and $(Ba,Sr,Ca)BPO_5:Eu^{2+}$; (b) $Sr_4Al_{14}O_{24}:Eu^{2+}$, $BaAl_8O_{13}:Eu^{2+}$, $2SrO.0.84P_2O_5.0.16B_2O_3:Eu^{2+}$, $MgWO_4$, $BaTiP_2O_8$, $(Ba,Sr,Ca)MgAl_{10}O_{17}:Eu^{2+}$, $Mn^{2+}$, and $(Ba,Sr,Ca)_5(PO_4)_3(Cl,F,OH):Sb^{3+}$; (c) $LaPO_4:Ce^{3+},Tb^{3+}$, $CeMgAl_{11}O_{19}:Tb^{3+}$, $GdMgB_5O_{10}:Ce^{3+},Tb^{3+},Mn^{2+}$, and $GdMgB_5O_{10}:Ce^{3+},Tb^{3O+}$; (d) $(Tb,Y,Lu,La,Gd)_x(Al,Ga)_yO_{12}:Ce^{3+}$, wherein x is in the range from about 2.8 to and including 3 and y is in the range from about 4 to and including 5, and $(Ba,Sr,Ca)_5(PO_4)_3(Cl,F,OH):Eu^{2+},Mn^{2+},Sb^{3+}$; (e) $(Y,Gd,La,Lu,Sc)_2O_3:Eu^{3+}$, $(Y,Gd,La,In,Lu,Sc)BO_3:Eu^{3+}$, $(Y,Gd,La)(AlGa)O_3:Eu^{3+}$, $(Ba,Sr,Ca)(Y,Gd,La,Lu)_2O_4:Eu^{3+}$, $(Y,Gd)Al_3B_4O_{12}:Eu^{3+}$, monoclinic $Gd_2O_3:Eu^{3+}$, $(Gd,Y)_4(Al,Ga)_2O_9:Eu^{3+}$, $(Ca,Sr)(Gd,Y)_3(Ge,Si)Al_3O_9:Eu^{3+}$, $(Sr,Mg)_3(PO_4)_2:Sn^{2+}$, and $GdMgB_5O_{10}:Ce^{3+},Mn^{2+}$; (f) $3.5MgO0.5MgF_2GeO_2:Mn^{4+}$. By mixing appropriate proportions of these phosphors, composites of spectra may be created that provide a wide range of colors in the visible spectrum.

In one aspect of the present invention, a phosphor blend comprises $(Tb,Y,Lu,La,Gd)_x(Al,Ga)_yO_{12}:Ce^{3+}$, wherein x and y are defined above, and at least another phosphor selected from one of the groups: (a) $(Ba,Sr,Ca)_5(PO_4)_3(Cl,F,OH):Eu^{2+}$, $(Ba,Sr,Ca)MgAl_{10}O_{17}:Eu^{2+}$, and $(Ba,Sr,Ca)BPO_5:Eu^{2+}$; (b) $Sr_4Al_{14}O_{25}:Eu^{2+}$, $BaAl_8O_{13}:Eu^{2+}$, $2SrO0.84P_2O_50.16B_2O_3:Eu^{2+}$, $MgWO_4, BaTiP_2O_8$, $(Ba,Sr,Ca)MgAl_{10}O_{17}:Eu^{2+}$, $Mn^{2+}$, and $(Ba,Sr,Ca)_5(PO_4)_3(Cl,F,OH):Sb^{3+}$; (c) $LaPO_4:Ce^{3+}$, $Tb^{3+}$, $CeMgAl_{11}O_{19}:Tb^{3+}$, $GdMgB_5O_{10}:Ce^{3+},Tb^{3+},Mn^{2+}$, and $GdMgB_5O_{10}:Ce^{3+},Tb^{3+}$; (d) $(Y,Gd,La,Lu,Sc)_2O_3:Eu^{3+}$, $(Y,Gd,La,In,Lu,Sc)BO_3:Eu^{3+}$, $(Y,Gd,La)(Al,Ga)O_3:Eu^{3+}$, $(Ba,Sr,Ca)(Y,Gd,La,Lu)_2O_4:Eu^{3+}$, $(Y,Gd)Al_3B_4O_{12}:Eu^{3+}$, monoclinic $Gd_2O_3:Eu^{3+}$, $(Gd,Y)_4(Al,Ga)_2O_9:Eu^{3+}$, $(Ca,Sr)Gd,Y)_3(Ge,Si)Al_3O_9:Eu^{3+}$, $(Sr,Mg)_3(PO_4)_2:Sn^{2+}$, and $GdMgB_5O_{10}:Ce^{3+}$, $Mn^{2+}$; (e) $3.5MgO0.5MgF_2:Mn^{4+}$.

A light source comprises a phosphor blend of the present invention. The light source has a correlated color temperature ("CCT") in the range from about 2700 K to about 6500 K and a CRI in the range from about 80 to about 100. The phosphor blend is excitable by radiation emitted by a discharge contained in the light source and emits visible EM having wavelengths from about 490 nm to about 770 nm.

In one aspect of the present invention, the light source is a mercury discharge lamp.

Other aspects, advantages, and salient features of the present invention will become apparent from a perusal of the following detailed description, which, when taken in conjunction with the accompanying figures, discloses embodiments of the present invention.

DETAILED DESCRIPTION

Figure 1:
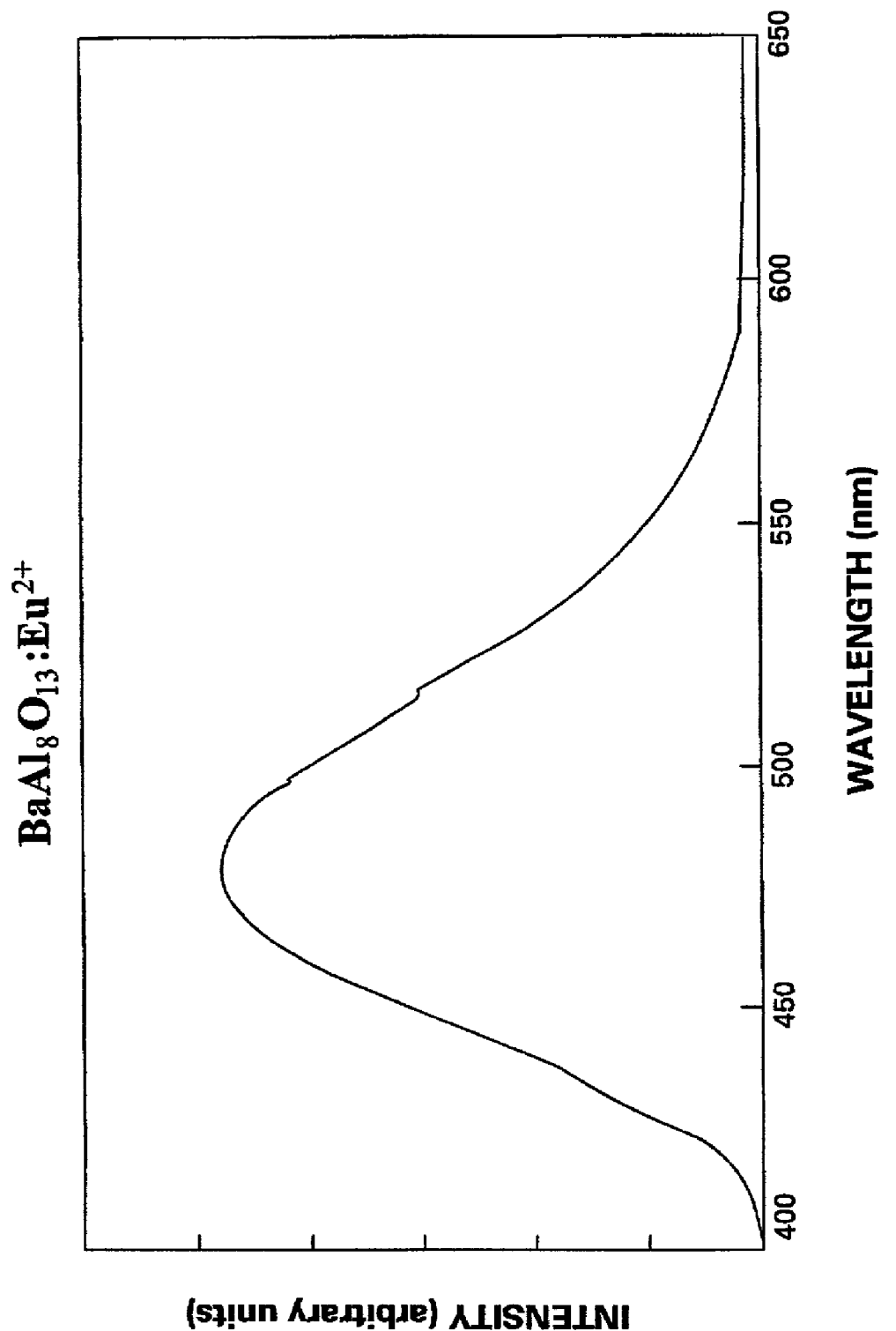
FIG. 1 shows an emission spectrum of $BaAl_8O_{13}:Eu^{2+}$ under UV excitation at 254 nm.
Figure 2:
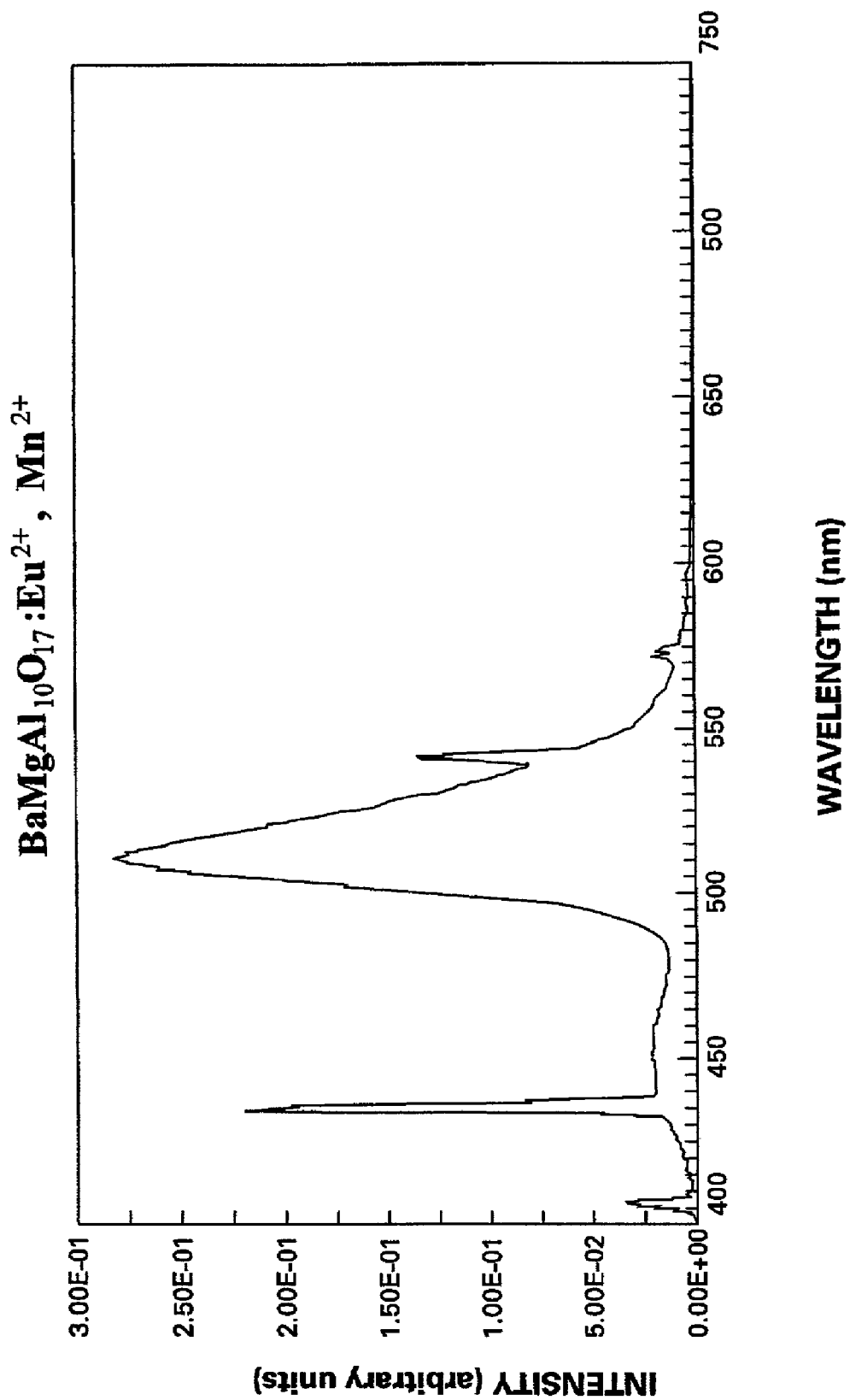
FIG. 2 shows an emission spectrum of $BaMgAl_{10}O_{17}:Eu^{2+}, Mn^{2+}$ under UV excitation of 254 nm.
Figure 3:
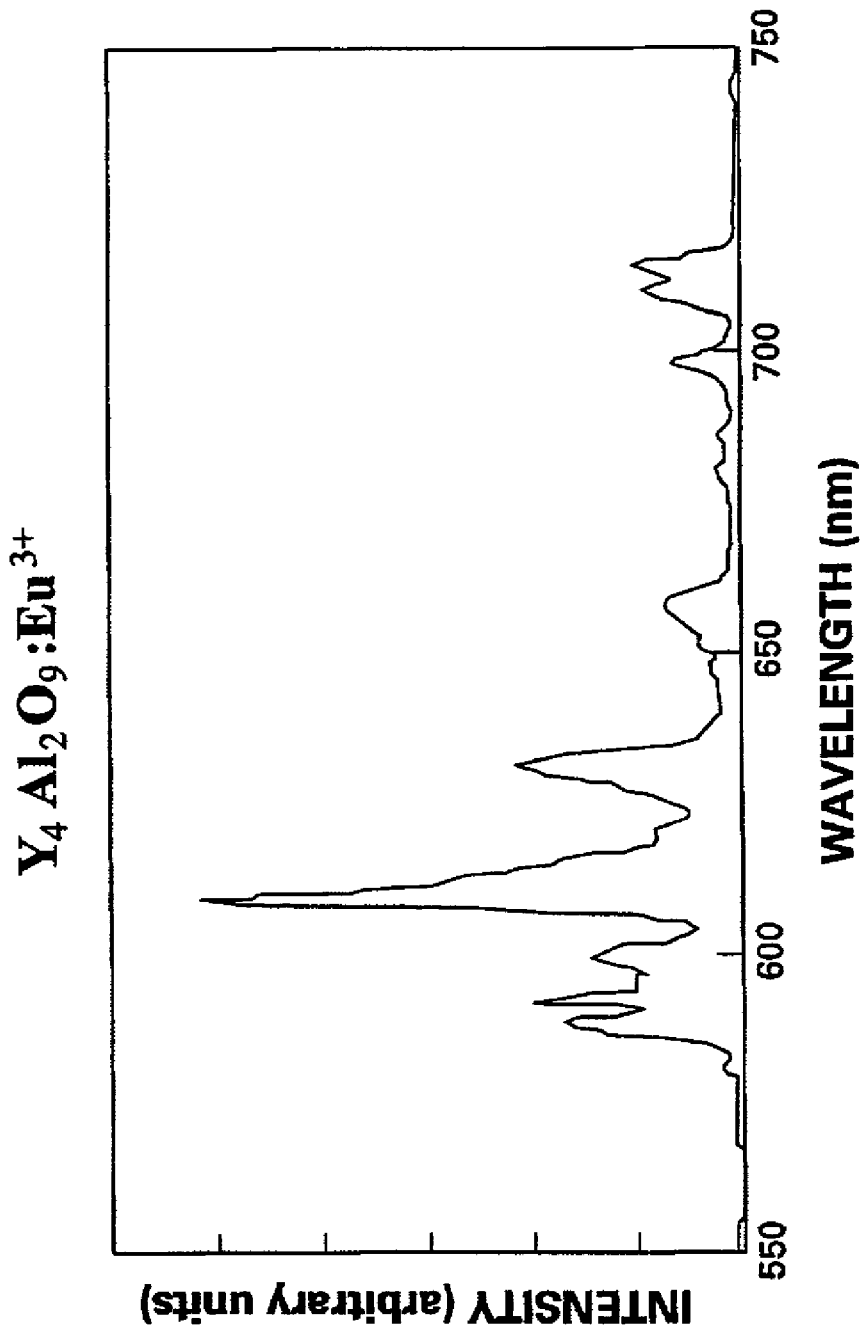
FIG. 3 shows an emission spectrum of $Y_4Al_2O_9:Eu^{3+}$ under UV excitation at 254 nm.
Figure 4:
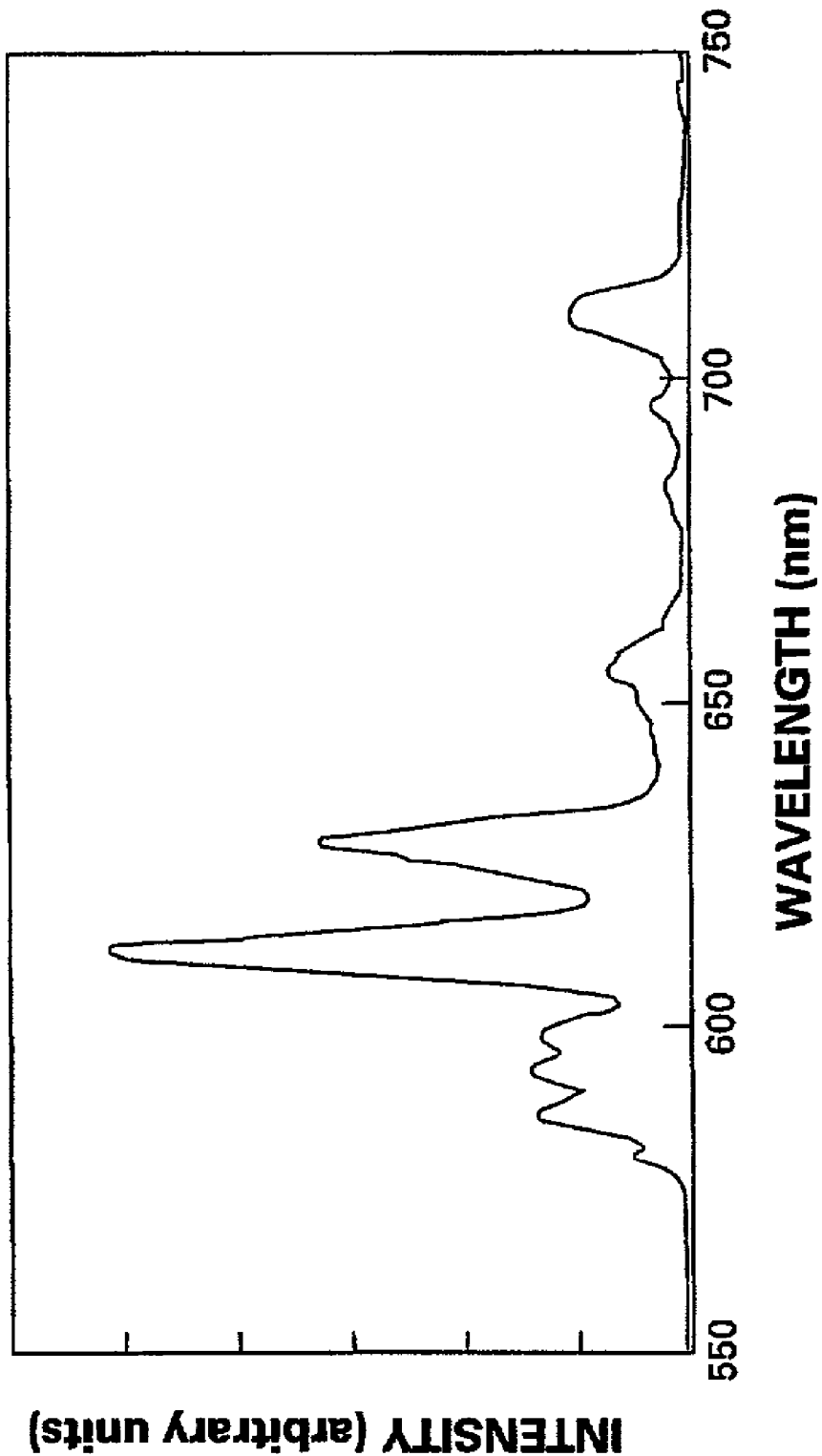
FIG. 4 shows an emission spectrum of $CaY_3AlGeO_9:Eu^{3+}$ under UV excitation at 254 nm.
Figure 5:
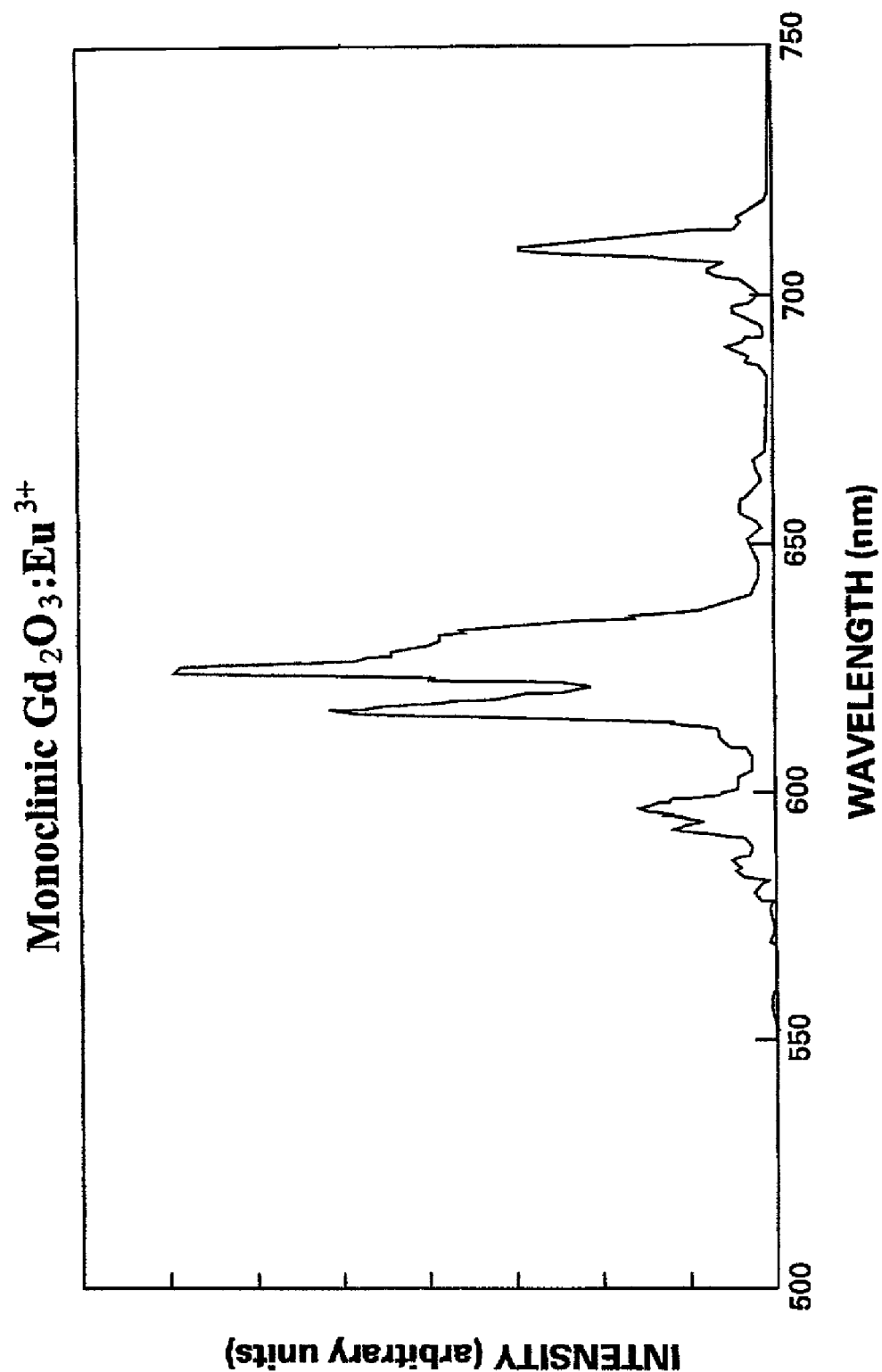
FIG. 5 shows an emission spectrum of monoclinic $Gd^2O_3:Eu^{3+}$ under UV excitation at 254 nm.
Figure 6:
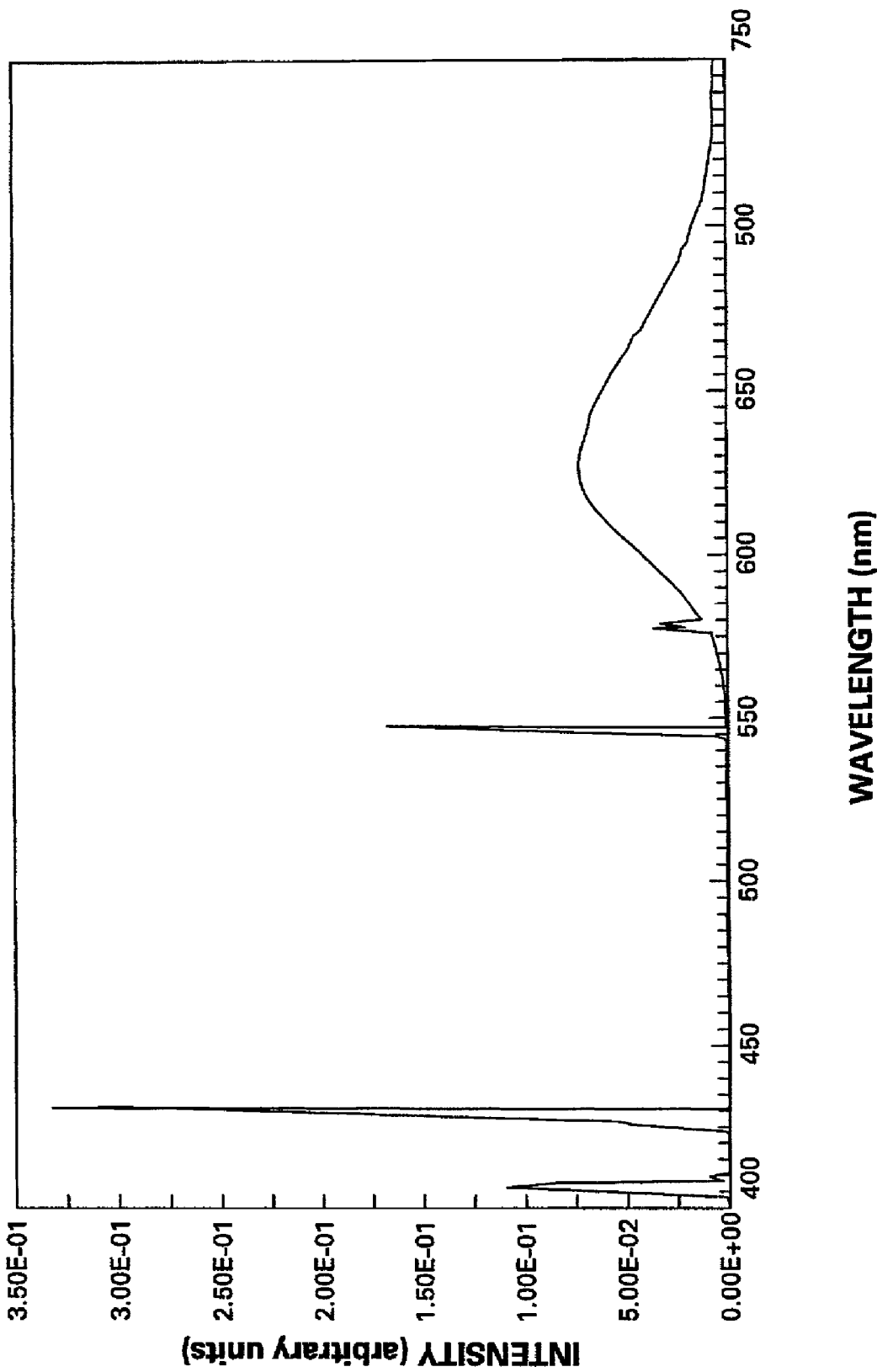
FIG. 6 shows an emission spectrum of $GdMgB_5O_{10}:Ce^{3+}, Mn^{2+}$ under UV excitation at 254 nm.
Figure 7:
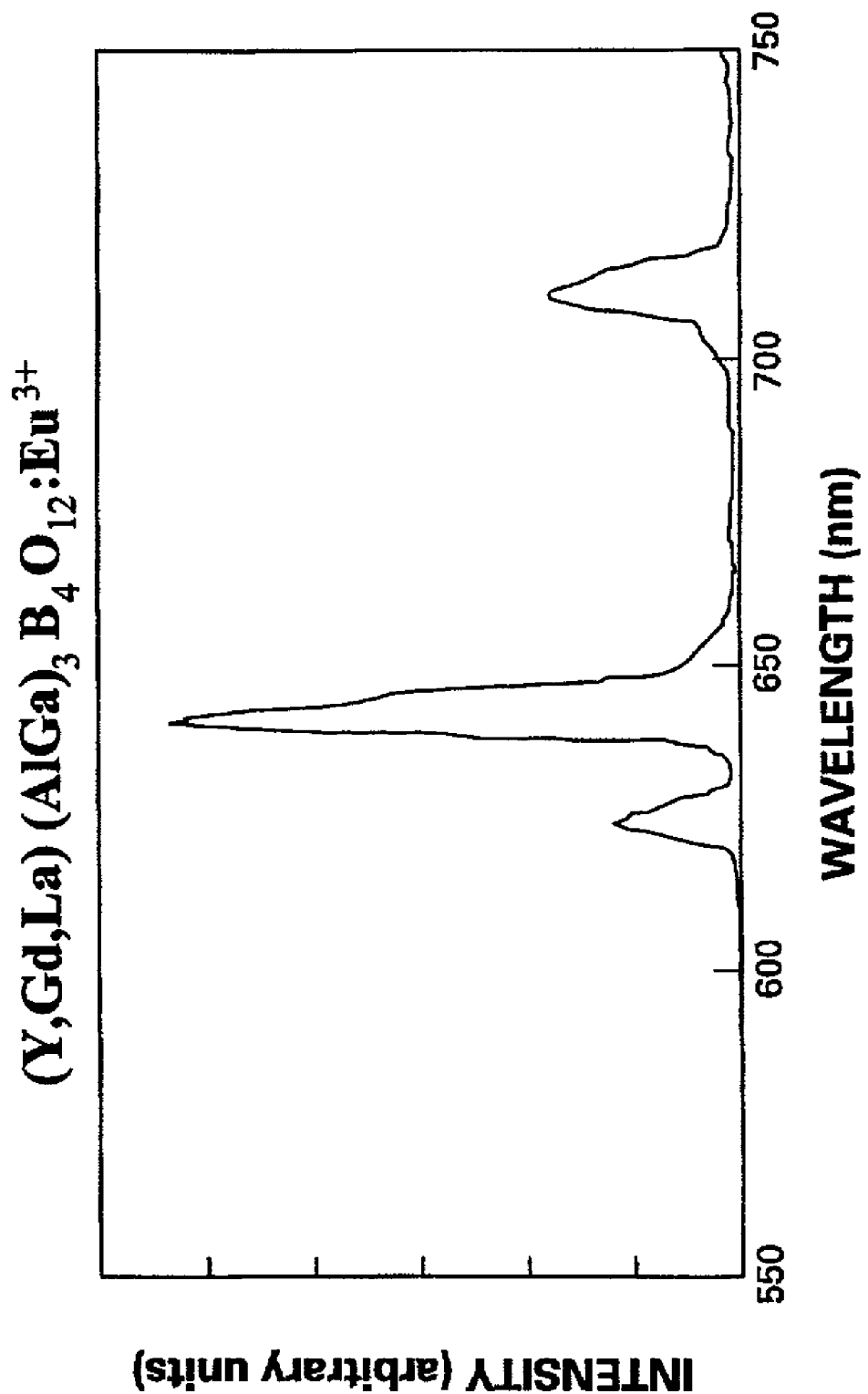
FIG. 7 shows an emission spectrum of $(Y_{0.9}Eu_{0.1})Al_3B_4O_{12}$ under UV excitation at 254 nm.
Figure 8:
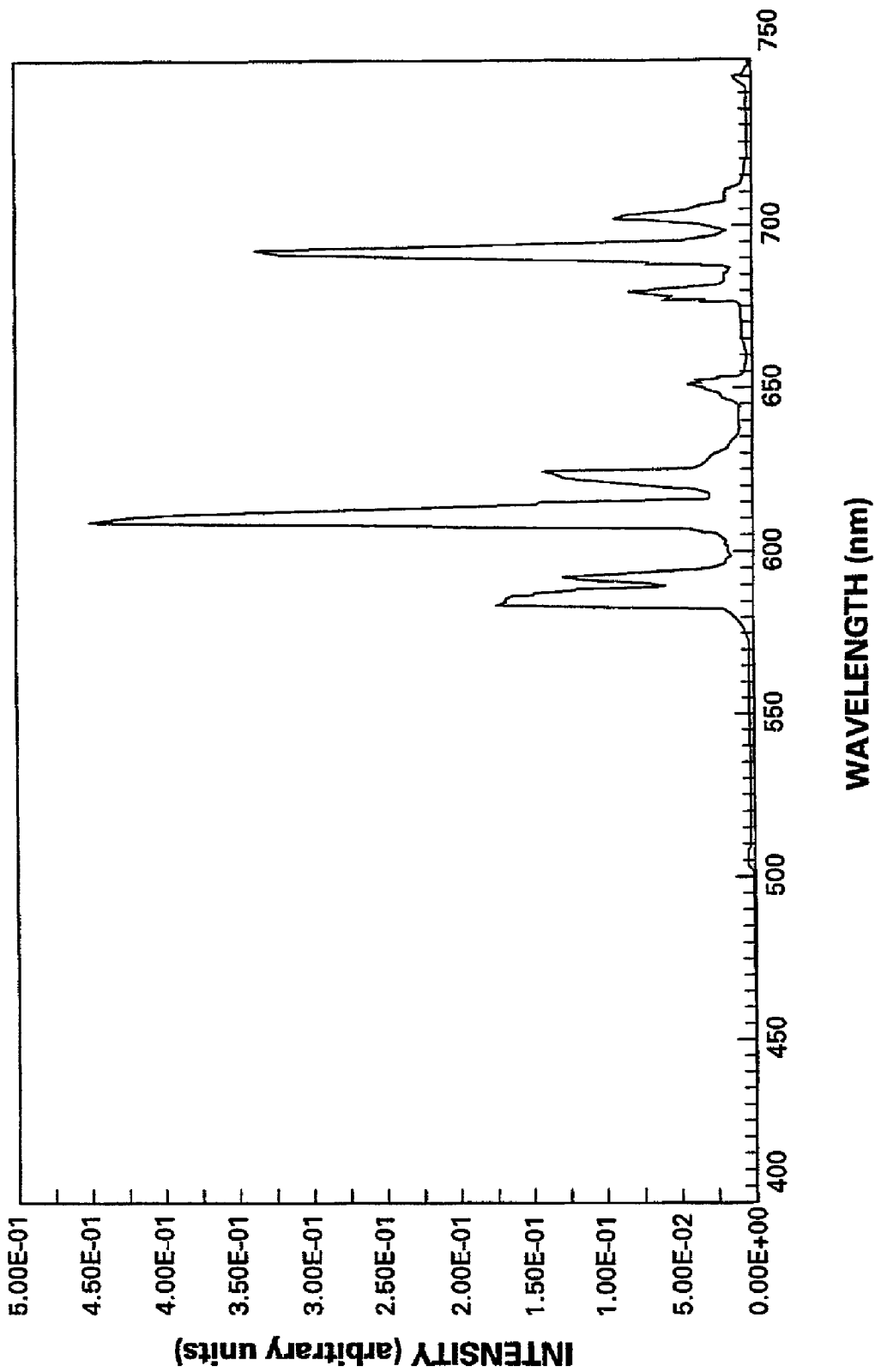
FIG. 8 shows an emission spectrum of $(Y_{0.9}Eu_{0.1})AlO_3$ under UV excitation at 254 nm.
Figure 9:
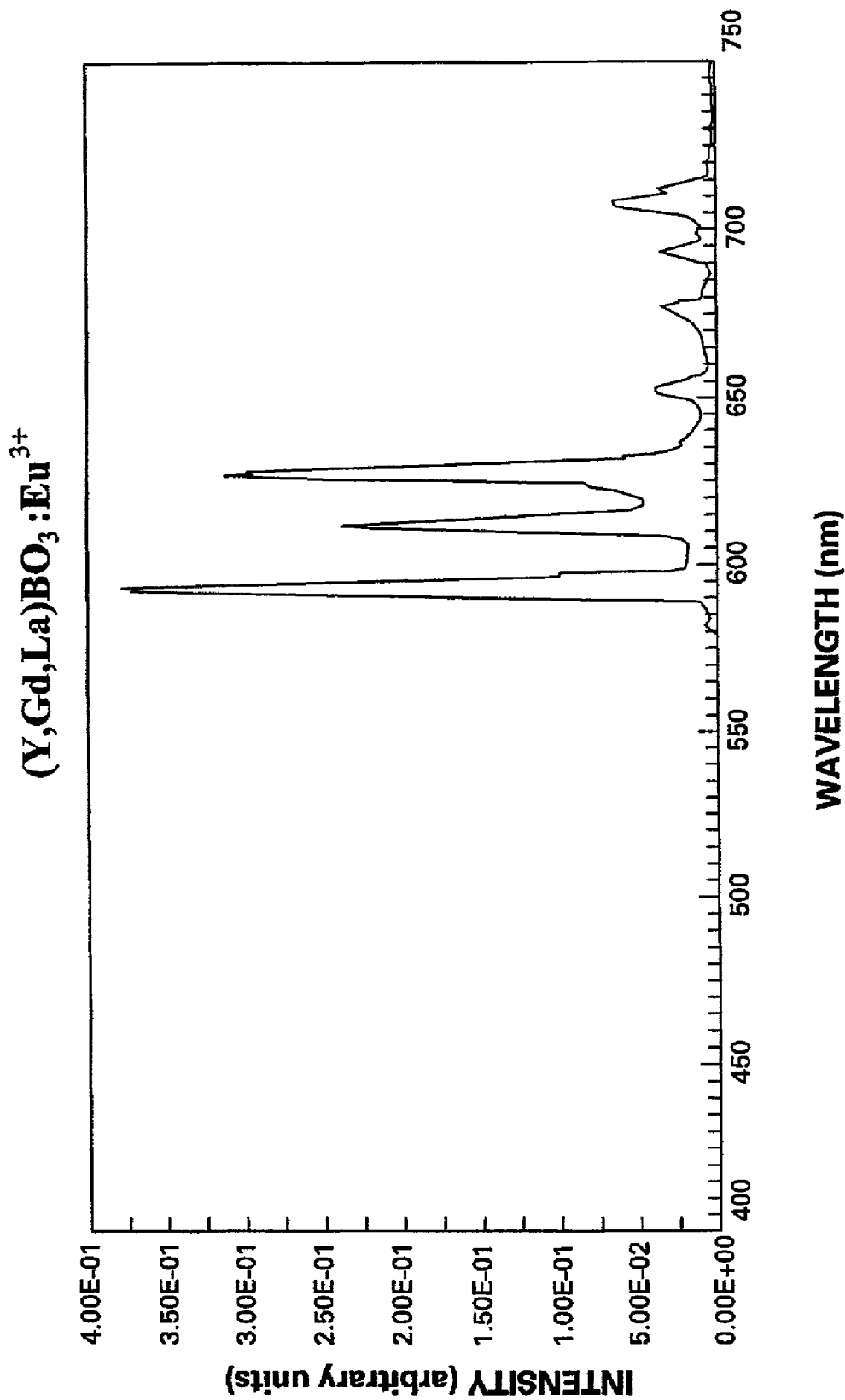
FIG. 9 shows an emission spectrum of $(Y_{0.4}Gd_{0.35}La_{0.1})BO_3$ under UV excitation at 254 nm.
Figure 10:
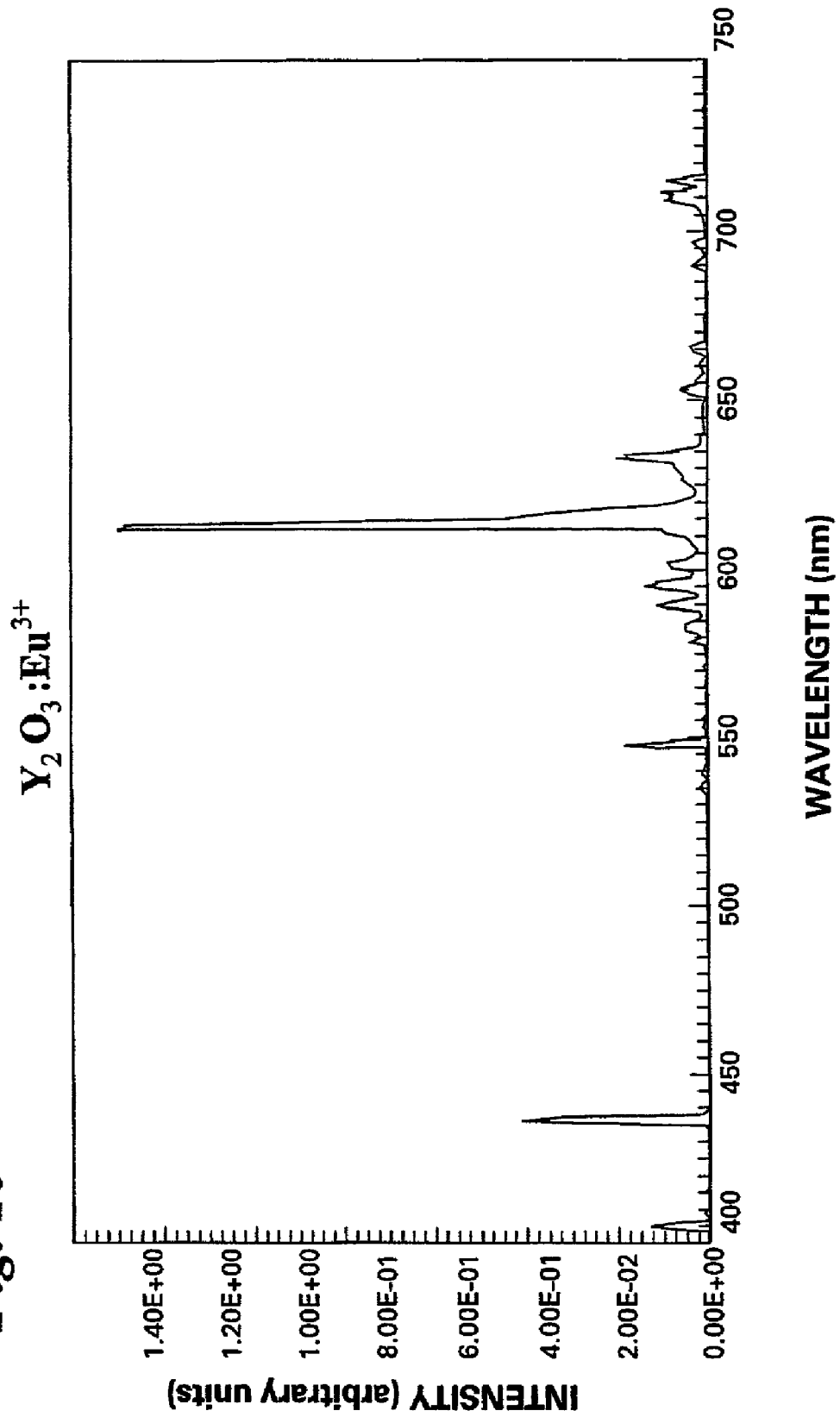
FIG. 10 shows an emission spectrum of $Y_2O_3:Eu^{3+}$ under UV excitation at 254 nm.
Figure 11:
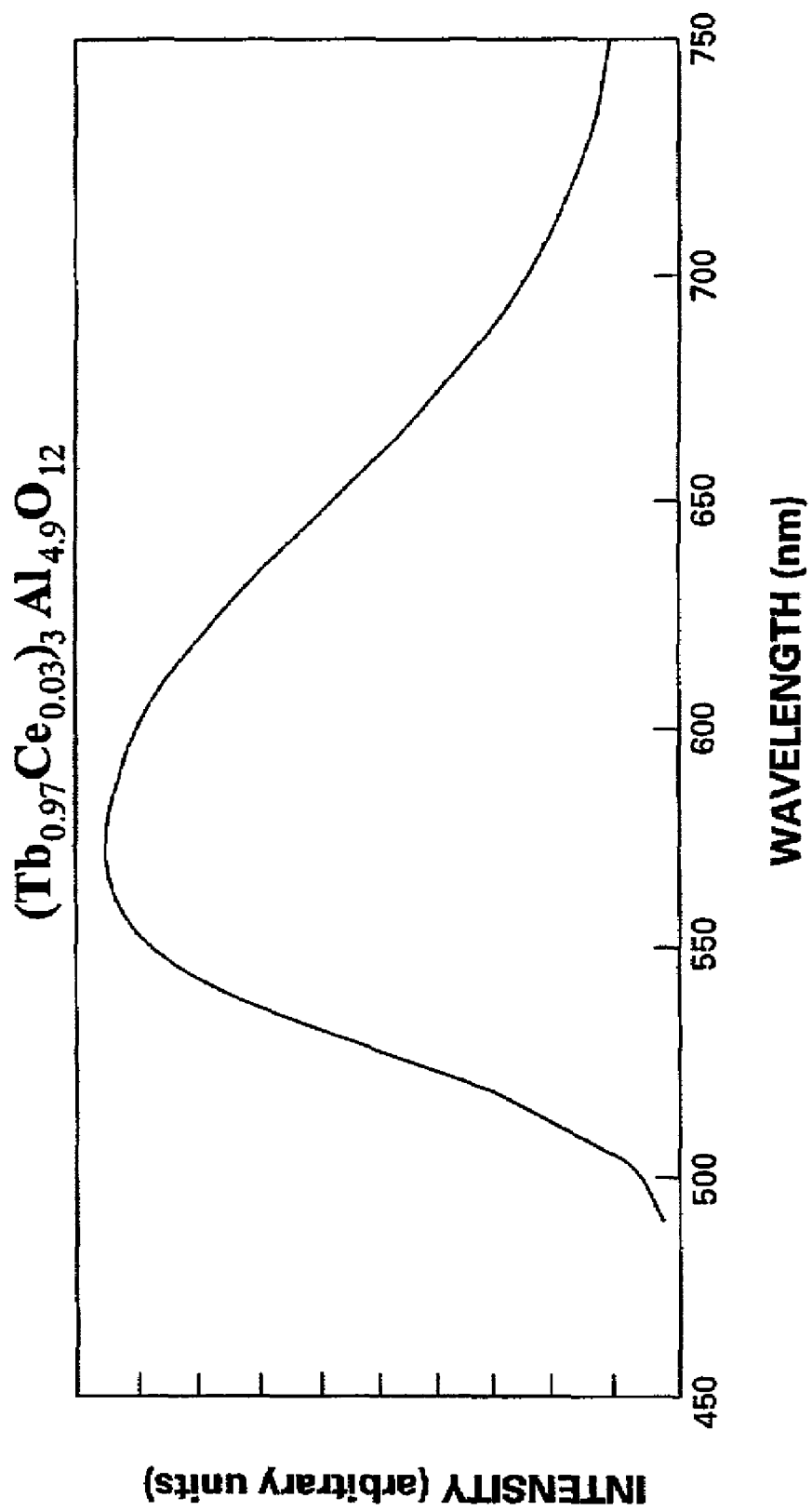
FIG. 11 shows an emission spectrum of $(Tb_{0.97}Ce_{0.03})_3Al_{4.9}O_{12}$ under blue visible light excitation.
Figure 12:
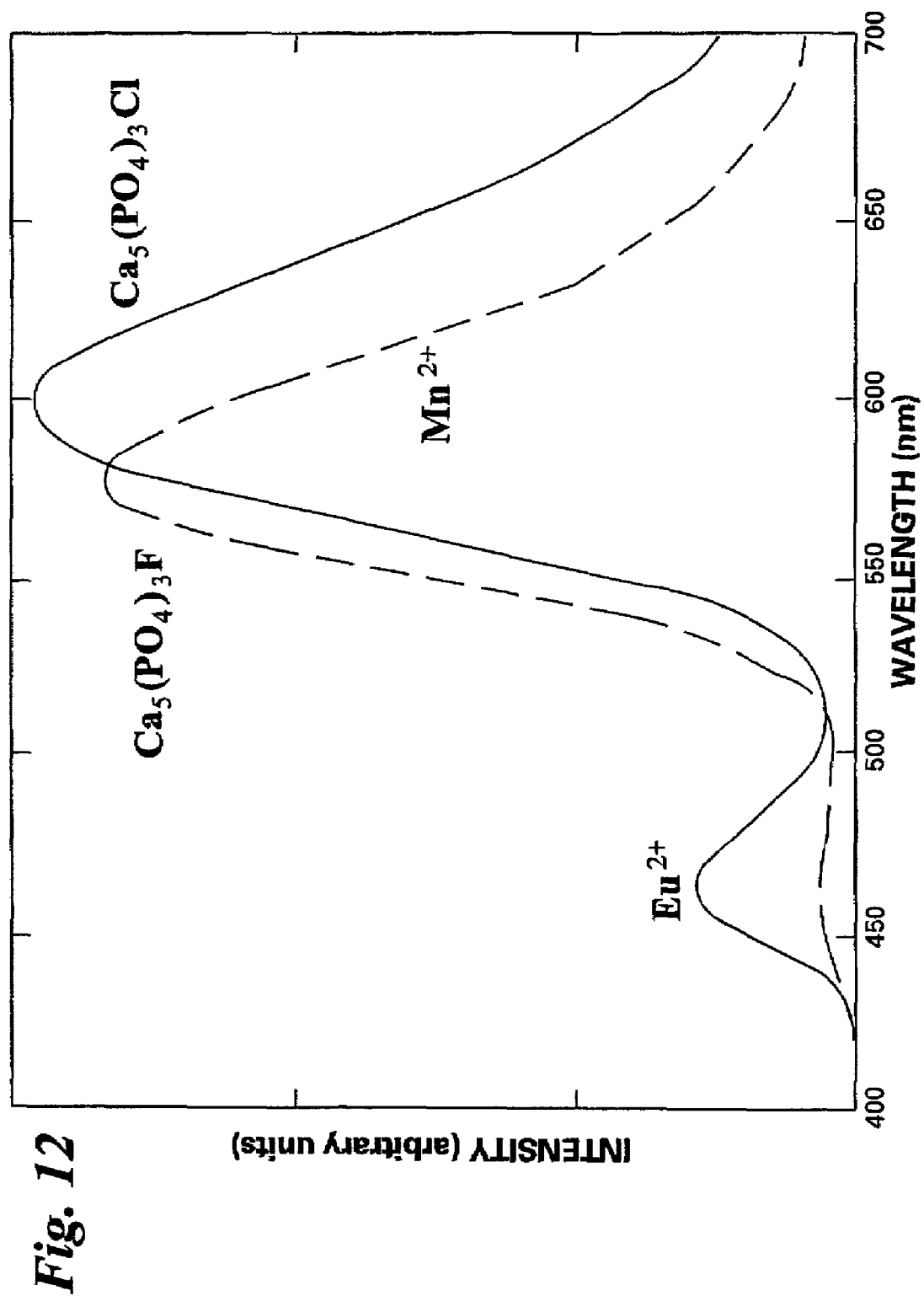
FIG. 12 shows emission spectra of $Ca_5(PO_4)_3F:Eu^{2+},Mn^{2+}$ and $Ca_5(PO_4)_3Cl:Eu^{2+}, Mn^{2+}$ under UV excitation at 254 nm.

The present invention provides convenient phosphor blends that are excitable by EM radiation having wavelengths in the UV range (from about 200 nm to about 400 nm) to emit efficiently visible light in the wavelength range from about 490 nm to about 770 nm. The terms "EM radiation" or "radiation" and "light" are used interchangeably herein. A major portion of the exciting radiation preferably has wavelengths in the range from about 250 to about 350 nm, more preferably from about 250 nm to about 300 nm. In particular, phosphor blends of the present invention are advantageously applied to a UV-emitting gas discharge to generate a light source having CCT in the range from about 2700 to about 6500 K and CRI in the range from about 80 to about 100. A phosphor blend of the present invention can be formulated to tune the CCT of fluorescent lamps and increase their CRI above that of prior-art fluorescent lamps.

A phosphor blend of the present invention comprises a mixture of at least two phosphors, each selected from one of the groups: (a) $(Ba,Sr,Ca)_5(PO_4)_3 (Cl,F,OH):Eu^{2+}$, $(Ba,Sr,Ca)MgAl_{10}O_{17}:Eu^{2+}$, and $(Ba,Sr,Ca)BPO_5:Eu^{2+}$; (b) $Sr_4Al_{14}O_{25}:Eu^{2+}$, $BaAl_8O_{13}:Eu^{2+}$, $2SrO0.84P_2O_50.16B_2O_3:Eu^{2+}$, $MgWO_4$, $BaTiP_2O_8$, $(Ba,Sr,Ca)MgAl_{10}O_{17}:Eu^{2+}$, $Mn^{2+}$, and $(Ba,Sr,Ca)_5(PO_4)_3 (Cl,F,OH):Sb^{3+}$; (c) $LaPO_4:Ce^{3+}$, $Tb^{3+}$, $CeMgAl_{11}O_{19}:Tb^{3+}$, $GdMgB_5O_{10}:Ce^{3+}$, $Tb^{3+}$, $MN^{2+}$, and $GdMgB_5O_{10}:Ce^{3+}$, $Tb^{3+}$; (d) $(Tb,Y,Lu,La,Gd)_x (Al,Ga)_yO_{12}:Ce^{3+}$, and $(Ba,Sr,Ca)_5(PO_4)_3(Cl,F,OH):Eu^{2+}$, $Mn^{2+},Sb^{3+}$; (e) $(Y,Gd,La,Lu,Sc)_2 O_3:Eu^{3+}$, $(Y,Gd,La,In,Lu,Sc)BO_3:Eu^{3+}$, $(Y,Gd,La)(Al,Ga)O_3:Eu^{3+}$, $(Ba,Sr,Ca)(Y,Gd,La,Lu)_2O_4:Eu^{3+}$, $(Y,Gd)Al_3B_4O_{12}:Eu^{3+}$, monoclinic $Gd_2O_3:Eu^{3+}$, $(Gd,Y)_4(Al,Ga)_2 O_9:Eu^{3+}$, $(Ca,Sr)(Gd,Y)_3(Ge,Si)Al_3O_9:Eu^{3+}$, $(Sr,Mg)_3(PO_4)_2:Sn^{2+}$, and $GdMgB_5O_{10}:Ce^{3+}$, $Mn^{2+}$; and (f) $3.5 MgO-0.5MgF_2-GeO_2:Mn^{4+}$; wherein x is in the range from about 2.8 to and including 3 and y is in the range from about 4 to and including 5, preferably from about 4.5 to and including 5, and more preferably from about 4.6 to and including 5. By mixing appropriate proportions of these phosphors, composites of spectra may be created that provide a wide range of colors in the visible spectrum. In one embodiment, each phosphor of the blend is selected from a different group disclosed above. In this disclosure, a series of elements or elements and groups of elements contained in parentheses and separated by commas means that these elements or elements and groups of elements may be interchangeable within the crystal lattice. Thus, one element in the series may be partially substituted with another element in that series. The ion or ions that follow the colon in the formula represent the activated ion or ions in the phosphor. The activator ion is typically present in a minor concentration. Typical activator concentrations are less than about 20 mole percent and, more frequently, less than about 10 mole percent. Each of the groups of phosphors mainly emits in a portion of the visible spectrum with emission peak wavelength in the of about 400-500 nm, 450-520 nm, 520-580 nm, 550-600 nm, 600-650 nm, and 640-700 nm, respectively. For example, while light may be obtained from a UV source, such as a low-pressure mercury discharge lamp, by providing a phosphor blend comprising: (1) at least a phosphor selected from group (a) or (b) and at least a phosphor selected from group (d); or (2) phosphors selected from each of groups (a) or (b), (c), and (e).

By mixing appropriate proportions of these phosphors, a composite emission spectrum of the blend may be created that provides a desired CCT and CRI with high luminosity (as defined by the lumens per watt of electrical input energy). Compositions of phosphor blends may be chosen to provide emission of white light having coordinates close to the black body locus of the CIE chromaticity diagram. In general lighting applications, it is desirable to provide light source having CCT in the range of about 3000 K to about 6000 K. This need has been largely satisfied with fluorescent lamps, which are more energy-efficient than incandescent lamps. However, these lamps typically have CRIs in the range of about 75 to about 85. Thus, it is very desirable to provide fluorescent lamps in this range of CCTs that have higher CRIs so that objects illuminated by these lamps appear more natural to the human eyes. Such light sources can be obtained by incorporating a phosphor blend of the present invention in a UV-emitting radiation source, such as a low-mercury discharge. Tables 1-4 present the result of simulations of incorporating different blends of phosphors of the present invention in a low-pressure mercury discharge lamp to generate light sources having CCT of about 2700, 3000, 3500, and 4000 K, respectively, and CRIs higher than 85 (except for Example 2). In Tables 1-4, the numerical value for each individual phosphor represents the proportion of the composite spectrum that the emission from the individual phosphor must contribute to result in the specified CCT, CRI, luminous output, and the (x,y) coordinate on the CIE diagram; and it is not the physical fraction of the individual phosphor in the blend.

TABLE 1

| | | Example | | | | | | |
|---|---|---|---|---|---|---|---|---|
| | | 1 | 2 | 3 | 4 | 5 | 6 | 7 |
| Phosphor Composition | $Y_2O_3:Eu^{3+}$ | 0.59 | 0.59 | 0.59 | 0.44 | 0.57 | 0.45 | 0.44 |
| | $(Y, Gd)BO_3:Eu^{3+}$ | 0 | 0 | 0 | 0 | 0 | 0 | 0 |
| | $3.5MgO \cdot 0.5MgF_2 \cdot GeO_2:Mn^{4+}$ | 0 | 0 | 0 | 0.2 | 0 | 0 | 0.7 |
| | $GdAlO_3:Eu^{3+}$ | 0 | 0 | 0 | 0 | 0 | 0 | 0 |
| | $GdMgB_5O_{10}:Ce^{3+}$ | 0 | 0 | 0 | 0 | 0 | 0 | 0 |
| | $LaPO_4:Ce^{3+}, Tb^{3+}$ | 0.33 | 0.38 | 0.35 | 0.30 | 0.33 | 0.17 | 0.21 |
| | $Tb_3Al_5O_{12}:Ce^{3+}$ | 0 | 0 | 0 | 0 | 0 | 0.26 | 0.18 |
| | $(Ba, Ca)_5(PO_4)_3Cl:Eu^{2+}$ | 0 | 0 | 0 | 0 | 0 | 0 | 0 |
| | $(Ba, Ca, Sr)MgAl_{10}O_{17}:Mn^{2+}$ | 0 | 0 | 0 | 0 | 0 | 0 | 0 |
| | $Sr_4Al_{14}O_{25}:Eu^{2+}$ | 0.08 | 0 | 0 | 0.06 | 0.08 | 0.12 | 0.10 |
| | CCT (K) | 2758 | 2758 | 2758 | 2758 | 2758 | 2758 | 2758 |
| | Luminous Output (lumen) | 568 | 589 | 580 | 496 | 565 | 483 | 483 |
| CIE Coordinate | x | 0.451 | 0.451 | 0.451 | 0.451 | 0.451 | 0.451 | 0.451 |
| | y | 0.402 | 0.402 | 0.402 | 0.402 | 0.402 | 0.402 | 0.402 |
| | CRI | 86.1 | 83.7 | 85.1 | 87.1 | 86.1 | 87.9 | 88.1 |

TABLE 2

| | | Example | | | | | | | |
|---|---|---|---|---|---|---|---|---|---|
| | | 8 | 9 | 10 | 11 | 12 | 13 | 14 | 15 |
| Phosphor Composition | $Y_2O_3:Eu^{3+}$ | 0.53 | 0.54 | 0.25 | 0.43 | 0.23 | 0.32 | 0.40 | 0.40 |
| | $(Y, Gd)BO_3:Eu^{3+}$ | 0 | 0 | 0.34 | 0 | 0 | 0 | 0 | 0 |
| | $3.5MgO \cdot 0.5MgF_2 \cdot GeO_2:Mn^{4+}$ | 0 | 0 | 0 | 0.14 | 0 | 0 | 0 | 0 |
| | $GdAlO_3:Eu^{3+}$ | 0 | 0 | 0 | 0 | 0.38 | 0 | 0 | 0 |
| | $GdMgB_5O_{10}:Ce^{3+}$ | 0 | 0 | 0 | 0 | 0 | 0.32 | 0 | 0 |
| | $LaPO_4:Ce^{3+}, Tb^{3+}$ | 0.32 | 0.30 | 0.26 | 0.29 | 0.26 | 0.23 | 0.18 | 0.20 |
| | $Tb_3Al_5O_{12}:Ce^{3+}$ | 0 | 0 | 0 | 0 | 0 | 0 | 0.25 | 0.19 |
| | $(Ba, Ca)_5(PO_4)_3Cl:Eu^{2+}$ | 0 | 0.16 | 0 | 0 | 0 | 0 | 0 | 0 |
| | $(Ba, Ca, Sr)MgAl_{10}O_{17}:Mn^{2+}$ | 0 | 0 | 0 | 0 | 0 | 0 | 0 | 0 |
| | $Sr_4Al_{14}O_{25}:Eu^{2+}$ | 0.16 | 0 | 0.15 | 0.14 | 0.14 | 0.13 | 0.17 | 0.16 |
| | CCT (K) | 3103 | 3028 | 3026 | 3090 | 3049 | 3026 | 3125 | 3117 |
| | Luminous Output (lumen) | 558 | 565 | 499 | 504 | 483 | 483 | 483 | 483 |
| CIE Coordinate | x | 0.430 | 0.430 | 0.430 | 0.430 | 0.430 | 0.430 | 0.430 | 0.430 |
| | y | 0.402 | 0.393 | 0.393 | 0.401 | 0.396 | 0.393 | 0.405 | 0.404 |
| | CRI | 88.4 | 87.5 | 88.7 | 89.0 | 88.8 | 89.0 | 90.1 | 90.2 |

TABLE 3

| | | Example | | | | | | | |
|---|---|---|---|---|---|---|---|---|---|
| | | 15 | 16 | 17 | 18 | 19 | 20 | 21 | 22 |
| Phosphor Composition | $Y_2O_3:Eu^{3+}$ | 0.45 | 0.47 | 0.15 | 0.39 | 0.48 | 0.20 | 0.31 | 0.36 |
| | $(Y, Gd)BO_3:Eu^{3+}$ | 0 | 0 | 0.39 | 0 | 0 | 0 | 0 | 0 |
| | $3.5MgO \cdot 0.5MgF_2 \cdot GeO_2:Mn^{4+}$ | 0 | 0 | 0 | 0.09 | 0 | 0 | 0 | 0 |
| | $GdAlO_3:Eu^{3+}$ | 0 | 0 | 0 | 0 | 0 | 0.33 | 0 | 0 |
| | $GdMgB_5O_{10}:Ce^{3+}$ | 0 | 0 | 0 | 0 | 0 | 0 | 0.23 | 0 |
| | $LaPO_4:Ce^{3+}, Tb^{3+}$ | 0.31 | 0.28 | 0.24 | 0.29 | 0.31 | 0.25 | 0.25 | 0.18 |
| | $Tb_3Al_5O_{12}:Ce^{3+}$ | 0 | 0 | 0 | 0 | 0 | 0 | 0 | 0.20 |
| | $(Ba, Ca)_5(PO_4)_3Cl:Eu^{2+}$ | 0 | 0.25 | 0 | 0 | 0 | 0 | 0 | 0 |
| | $(Ba, Ca, Sr)MgAl_{10}O_{17}:Mn^{2+}$ | 0.24 | 0 | 0.22 | 0.22 | 0.21 | 0.22 | 0.22 | 0.25 |
| | $Sr_4Al_{14}O_{25}:Eu^{2+}$ | 0 | 0 | 0 | 0 | 0 | 0 | 0 | 0 |
| | CCT (K) | 3645 | 3536 | 3566 | 3644 | 3417 | 3602 | 3602 | 3645 |
| | Luminous Output (lumen) | 548 | 558 | 483 | 516 | 553 | 483 | 496 | 483 |

TABLE 3-continued

| | | Example | | | | | | | |
|---|---|---|---|---|---|---|---|---|---|
| | | 15 | 16 | 17 | 18 | 19 | 20 | 21 | 22 |
| CIE Coordinate | x | 0.403 | 0.403 | 0.403 | 0.403 | 0.414 | 0.403 | 0.403 | 0.403 |
| | y | 0.403 | 0.389 | 0.393 | 0.403 | 0.403 | 0.397 | 0.397 | 0.403 |
| | CRI | 90.9 | 89.7 | 91.5 | 91.4 | 90.0 | 91.5 | 91.4 | 91.9 |

TABLE 4

| | Example | | | | | | | | | |
|---|---|---|---|---|---|---|---|---|---|---|
| | 23 | 24 | 25 | 26 | 27 | 28 | 29 | 30 | 31 | 32 |
| Phosphor Composition | | | | | | | | | | |
| $Y_2O_3$:$Eu^{3+}$ | 0.40 | 0.41 | 0.41 | 0.44 | 0.29 | 0.24 | 0.19 | 0.31 | 0.34 | 0.40 |
| (Y, Gd)$BO_3$:$Eu^{3+}$ | 0 | 0 | 0 | 0 | 0 | 0 | 0 | 0 | 0 | 0 |
| 3.5MgO•0.5$MgF_2$•$GeO_2$:$Mn^{4+}$ | 0 | 0 | 0 | 0 | 0 | 0 | 0 | 0.13 | 0 | 0 |
| $GdAlO_3$:$Eu^{3+}$ | 0 | 0 | 0 | 0 | 0 | 0 | 0.28 | 0 | 0 | 0 |
| $GdMgB_5O_{10}$:$Ce^{3+}$ | 0 | 0 | 0 | 0 | 0 | 0.23 | 0 | 0 | 0 | 0 |
| $LaPO_4$:$Ce^{3+}$, $Tb^{3+}$ | 025 | 0.31 | 0.28 | 0.34 | 0.26 | 0.23 | 0.24 | 0.26 | 0.18 | 0.29 |
| $Tb_3Al_5O_{12}$:$Ce^{3+}$ | 0 | 0 | 0 | 0 | 0 | 0 | 0 | 0 | 0.16 | 0 |
| (Ba, Ca)$_5$(PO$_4$)$_3$Cl:$Eu^{2+}$ | 0.35 | 0.28 | 0 | 0 | 0 | 0 | 0 | 0 | 0 | 0 |
| (Ba, Ca, Sr)MgAl$_{10}$O$_{17}$:$Mn^{2+}$ | 0 | 0 | 0 | 0 | 0 | 0 | 0 | 0 | 0 | 0.04 |
| $Sr_4Al_{14}O_{25}$:$Eu^{2+}$ | 0 | 0 | 0.31 | 0.22 | 0.31 | 0.30 | 0.29 | 0.31 | 0.32 | 0.28 |
| CCT (K) | 4152 | 3984 | 4282 | 4016 | 4127 | 4245 | 4085 | 4266 | 4116 | 4128 |
| Luminous Output (lumen) | 545 | 568 | 531 | 534 | 511 | 483 | 483 | 483 | 483 | 535 |
| CIE Coordinate | | | | | | | | | | |
| x | 0.376 | 0.386 | 0.379 | 0.386 | 0.381 | 0.376 | 0.382 | 0.376 | 0.382 | 0.376 |
| y | 0.381 | 0.394 | 0.400 | 0.400 | 0.398 | 0.396 | 0.397 | 0.400 | 0.400 | 0.392 |
| CRI | 92.0 | 90.0 | 91.6 | 91.5 | 92.1 | 93.1 | 92.4 | 92.5 | 92.0 | 92.1 |

In addition to white light, light of other colors may be generated from other blends of phosphors that comprise individual phosphors selected from the groups disclosed above with appropriate proportions.

In one preferred embodiment, the phosphor blend comprises $(Tb,Y,Lu,La,Gd)_x(Al,Ga)_yO_{12}$:$Ce^{3+}$, wherein x and y are defined above, and at least another phosphor selected from one of the groups: (a) $(Ba,Sr,Ca)_5(PO_4)_3(Cl,F,OH)$:$Eu^{2+}$, $(Ba,Sr,Ca)MgAl_{10}O_{17}$:$Eu^{2+}$, and $(Ba,Sr,Ca)BPO_5$:$Eu^{2+}$; (b) $Sr_4Al_{14}O_{25}$:$Eu^{2+}$, $BaAl_8O_{13}$:$Eu^{2+}$, $2SrO0.84P_2O_50.16B_2O_3$:$Eu^{2+}$, $MgWO_4$, $BaTiP_2O_8$, $(Ba,Sr,Ca)MgAl_{10}O_{17}$:$Eu^{2+}$, $Mn^{2+}$, and $(Ba,Sr,Ca)_5(PO_4)_3(Cl,F,OH)$:$Sb^{3+}$; (c) $LaPO_4$:$Ce^{3+}$, $Tb^{3+}$, $CeMgAl_{11}O_{19}$:$Tb^{3+}$, $GdMgB_5O_{10}$:$Ce^{3+}$, $Tb^{3+}$, $Mn^{2+}$, and $GdMgB_5O_{10}$:$Ce^{3+}$, $Tb^{3+}$; (d) $(Y,Gd,La,Lu,Sc)_2O_3$:$Eu^{3+}$, $(Y,Gd,La,In,Lu,Sc)BO_3$:$Eu^{3+}$, $(Y,Gd,La)(Al,Ga)O_3$:$Eu^{3+}$, $(Ba,Sr,Ca)(Y,Gd,La,Lu)_2O_4$:$Eu^{3O+}$, $(Y,Gd)Al_3B_4O_{12}$:$Eu^{3+}$, monoclinic $Gd_2O_3$:$Eu^{3+}$, $(Gd,Y)_4(Al,Ga)_2O_9$:$Eu^{3+}$, $(Ca,Sr)(Gd,Y)_3(Ge,Si)Al_3O_9$:$Eu^{3+}$, $(Sr,Mg)_3(PO_4)_2$:$Sn^{2+}$, and $GdMgB_5O_{10}$:$Ce^{3+}$, $Mn^{2+}$; (e) $3.5MgO0.5MgF_2GeO_2$:$Mn^{4+}$.

Figure 14:
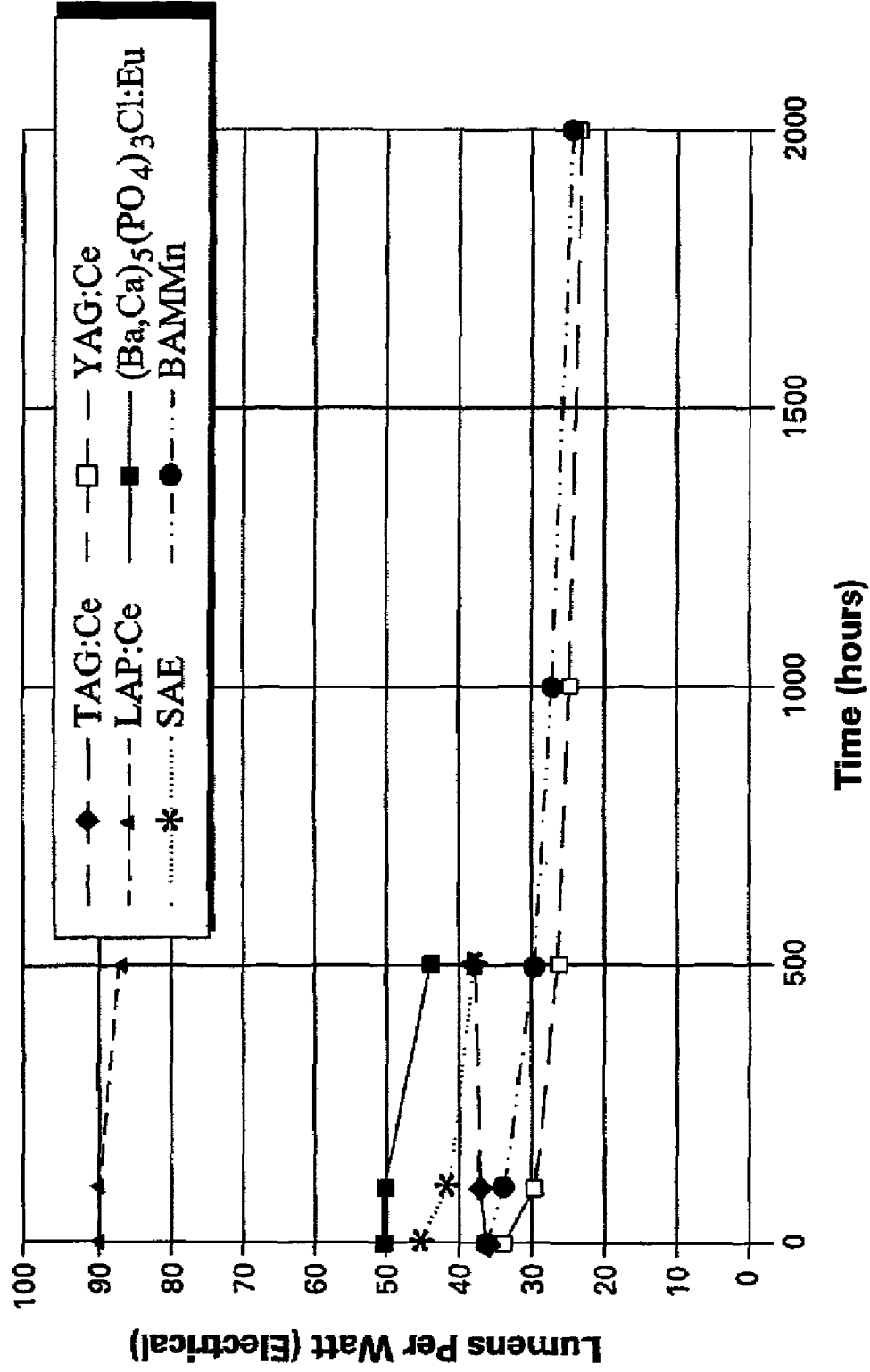
FIG. 14 shows the maintenance of luminous efficacy of lamps with single phosphors emitting in the blue-green to yellow range in long-term use.

$(Tb,Y,Lu,La,Gd)_x(Al,Ga)_yO_{12}$:$Ce^{3+}$("TAG:Ce"), wherein x and y are defined above, is advantageously used as a component of a phosphor blend when a yellow-orange component is desired because this phosphor has shown a long-term maintenance of luminous efficacy. FIG. 14 shows the luminous efficacy of single-color (in the range of blue-green to yellow) low-pressure mercury fluorescent lamps in long-term testing. The lamp with TAG:Ce phosphor showed no discernible loss in luminous efficacy while one with $Y_3Al_5O_{12}$:$Ce^{3+}$ showed a loss in luminous efficacy of over 20 percent.

The phosphor blend can be made by thoroughly combining appropriate amounts of individual chosen phosphors. Such a combining may be carried out in conventional mixing equipment. In addition, the mixture may be further milled or pulverized substantially to a desired particle size for incorporation in lighting devices. The individual phosphors may be made by any conventional solid-state reaction. For example, appropriate amounts of oxides and/or salts of the desired elements are mixed together thoroughly. The amounts are chosen so to achieve the final desired composition of the phosphor. The mixture is fired at an appropriate high temperature, such as greater than 900° C., to decompose the oxide or salts precursors to the desired compound. The firing may be done in an oxidizing or reducing atmosphere depending on the phosphor. The firing atmosphere may even be doped with other gases. For example, a halogen gas dopant may be necessary with halophosphate phosphors. The firing may done in stages at two or more temperatures, each stage may be carried out in a different atmosphere.

Alternatively, an acidic solution of oxides and/or salts of the desired elements is prepared by dissolving such oxides and/or salts in a mineral or organic acid. A solution of ammonium hydroxide or an amine is added slowly into the acidic solution to precipitate compounds of the chosen elements until the precipitation is complete. Typically, this step is complete when the pH of the mixture of the solutions rises above 8. The precipitate is filtered, washed, and dried in air. The dried precipitate is fired as described above.

White light-emitting device incorporation of a selected blend of the phosphors in a gas discharge device, such as a mercury discharge lamp that generates UV radiation in the wavelength range 250-300 nm, provides a white light source that uses electrical energy efficiently. For example, the phosphor blend may be milled or pulverized to a particle size of less than about 4 micrometers, preferably less than about 2 micrometers. The phosphor blend is then applied to the internal surface of the discharge lamp tube as is conventionally done. Light-scattering particles may be added into the phosphor blend to improve light extraction and/or to reduce the unwanted escape of unabsorbed UV radiation. The CCT of the light emitted device is adjusted by adjusting individual amounts of the phosphors in the blend. For example, a higher CCT is achieved by increasing the amount of phosphors having peak emission the range of 400-520 nm. On the other hand, a lower CCT is achieved by increasing the amount of phosphors having emission in the range of 600-700 nm.

While various embodiments are described herein, it will be appreciated from the specification that various combinations of elements, variations, equivalents, or improvements therein may be made by those skilled in the art, and are still within the scope of the invention as defined in the appended claims.

The invention claimed is:

1. A phosphor blend comprising $(Lu,La,Gd)_x(Al,Ga)_yO_{12}:Ce^{3+}$ or $(Tb,Y,Lu,La,Gd)_xGa_yO_{12}:Ce^{3+}$, wherein x is in a range from about 2.8 to and including 3 and y is a range from about 4 to and including 5, and at least one phosphor selected from the group consisting of $(Gd,La,Lu,Sc)_2O_3:Eu^{3+}$, $(Y,Gd,La,In,Lu,Sc)BO_3:Eu^{3+}$, $(Y,Gd,La)(Al,Ga)O_3:Eu^{3+}$, $(Ba,Sr,Ca)(Y,Gd,La, Lu)_2O_4:Eu^{3+}$, $(Y,Gd)Al_3B_4O_{12}:Eu^{3+}$, $(Gd,Y)_4(Al,Ga)_2O_9:Eu^{3+}$, and $(Ca,Sr)(Gd,Y)_3(Ge,Si)Al_3O_9:Eu^{3+}$, and at least one additional phosphor selected from the groups: (a) $(Ba,Sr,Ca)_5(PO_4)_3(F,OH):Eu^{2+}$, $(Sr,Ca)MaAl_{10}O_{17}:Eu^{2+}$, and $(Ba,Sr,Ca)BPO_3:Eu^{2+}$; (b) $BaTiP_2O_8$ and $Ba_5(PO_4)_3(Cl,F,OH):Sb^{3+}$; and (c) $GdMgB_5O_{10}:Tb^{3+}$; wherein said phosphor blend is capable of absorbing EM radiation having wavelengths in a range from about 200 nm to about 400 nm and emitting light in having wavelengths in a visible spectrum.

2. The phosphor blend of claim 1, wherein said phosphor blend absorbs EM radiation substantially in a wavelength range from about 250 nm to about 300 nm.

3. The phosphor blend of claim 2, wherein said white light has color coordinates substantially on a black body locus of a CIE chromaticity diagram.

4. The phosphor blend of claim 2, wherein said color coordinates of said white light is represented by a point at a distance less than or equal to about 0.0054 from a black body locus of a CIE chromaticity diagram.

5. The phosphor blend of claim 1, wherein said light emitted from said phosphor blend is white light.

6. The phosphor blend of claim 1, wherein y is in a range from about 4.5 to and including 5.

7. The phosphor blend of claim 1, wherein y is in a range from about 4.6 to and including 5.

8. A phosphor blend comprising a plurality of phosphors, each of said phosphors being selected from one of groups: (a) $(Ba,Sr,Ca)_5(PO_4)_3(F):Eu^{2+}$, $(Sr,Ca)mgAl_{10}O_{17}:Eu^{2+}$, and $(Ba,Sr,Ca)BPO_5:Eu^{2+}$; (b) $BaTiP_2O_8$, and $Ba_5(PO_4)_3(Cl,F,OH):Sb^{3+}$; (c) $(Lu,La,Gd)_x(Al,Ga)_yO_{12}:Ce^{3+}$ or $(Tb,Y,Lu,La,Gd)_xGa_yO_{12}:Ce^{3+}$, wherein x is a range from about 2.8 to and including 3 and y is in a range from about 4 to and including 5, and $(Ba,Sr,Ca)_5(PO_4)_3(F,OH):Eu^{2+}$, $Mn^{2+},Sb^{3+}$; and $Ba^5(PO_4)_3(Cl,F,OH):Mn^{2+},Sb^{3+}$ and (d) $(La,Lu,Sc)_2O_3:Eu^{3+}$, $(Y,Gd,La,In,Lu,Sc)BO_3:Eu^{3+}$, $(Y,Gd,La)(Al,Ga)O_3:Eu^{3+}$, $(Ba,Sr,Ca)(Y,Gd,La,Lu)_2O_4:Eu^{3+}$, $(Y,Gd)Al_3B_4O_{12}:Eu^{3+}$, $(Gd,Y)_4(Al,Ga)_2O_9:Eu^{3+}$, $(Ca,Sr)(Gd,Y)_3(Ge,Si)Al_3O_9:Eu^{3+}$, and $GdMgB_5O_{10}:Ce^{3+}$, $Mn^{2+}$; wherein at least two of said phosphors are selected from different groups, at least one of said phosphors is selected from group (d), and said phosphor blend is capable of absorbing EM radiation having wavelengths in a range from about 200 nm to about 400 nm and emitting light in having wavelengths in a visible spectrum.

9. The phosphor blend of claim 8, wherein y is in a range from about 4.6 to and including 5.

10. A phosphor blend comprising phosphors each of said phosphors being selected from one of groups: (a) $(Ba,Sr,Ca)_5(PO_4)_3(Cl,F,OH):Eu^{2+}$, $(Sr,Ca)MgAl_{10}O_{17}:Eu^{2+}$, and $(Ba,Sr,Ca)BPO_5:Eu^{2+}$; (b) $GdMgB_5O_{10}:Tb^{3+}$, (c) $(Lu,La,Gd)_x(Al,Ga)_yO_{12}:Ce^{3+}$ $(Tb,Y,Lu,La,Gd)_xGa_yO_{12}:Ce^{3+}$, and $(Ba,Sr,Ca)_5(PO_4)_3(Cl,F,OH):Eu^{2+}$ and $(Ba)_5(PO_4)_3(Cl,F,OH):Mn^{2+}$, $Sb^{3+}$; and (d) $(La,Lu,Sc)_2O_3:Eu^{3+}$, $(Y,Gd,La,In,Lu,Sc)BO_3:Eu^{30+}$, $(Y,Gd)Al_3B_4O_{12}:Eu^{3+}$, $(Gd,Y)_4(Al,Ga)_2O_9:Eu^{3+}$, and $(Ca,Sr)(Gd,Y)_3(Ge,Si)Al_3O_9:Eu^{3+}$; wherein x is in a range from about 2.8 to and including 3, y is in a range from about 4 to and including 5, at least two phosphors are selected from different groups, at least one phosphor is selected from group (d), and said phosphor blend is capable of absorbing EM radiation having wavelengths in a range from about 200 nm to about 400 nm and emitting light having wavelengths in a visible spectrum.

11. The phosphor blend of claim 10, wherein y is in a range from about 4.6 to and including 5.

12. A phosphor blend comprising phosphors, each of said phosphors being selected from one of groups: (a) $(Ba,Sr,Ca)_5(PO_4)_3(F):Eu^{2+}$, $(Sr,Ca)MgAl_{10}O_{17}:Eu^{2+}$, and $(Ba,Sr,Ca)BPO_5:Eu^{2+}$; and (b) $(Tb,Y,Lu,La,Gd)_x(Al,Ga)_yO^{12}:Ce^{3+}$ and $(Ba,Sr,Ca)_5(PO_4)_3(Cl,F,OH):Eu^{2+},Mn^{2+},Mn^{2+},Sb^{3+}$; wherein x is in a range from about 2.8 to and including 3, y is in a range from about 4 to and including 5, at least two phosphors are selected from different groups, and said phosphor blend is capable of absorbing EM radiation having wavelengths in a range from about 200 nm to about 400 nm and emitting light in having wavelengths in a visible spectrum.

13. A phosphor blend comprising phosphors, each of said phosphors being selected from one of groups: (a) $(Ba,Sr,Ca)_5(PO_4)_3(Cl,F,OH):Eu^{2+}$, $(Sr,Ca)MgAl_{10}O_{17}:Eu^{2+}$, and $(Ba,Sr,Ca)BPO_5:Eu^{2+}$; (b) $(Tb,Y,Lu,La,Gd)_x(Al,Ga)_yO_{12}:Ce^{3+}$ $(Tb,Y,Lu,La,Gd)_xGa_yO_{12}:Ce^{3+}$ $(Ba,Sr,Ca)_5(PO_4)_3(Cl,F,OH):Eu^{2+}$ and $Ba_5(PO_4)_3(Cl,F,OH):Eu^{2+},Mn^{2+},Sb^3$; wherein x is in arrange from about 2.8 to and including 3, y is in a range from about 4 to and including 5, at least two phosphors are selected from different groups, and said phosphor blend is capable of absorbing EM radiation having wavelengths in a range from about 200 nm to about 400 nm and emitting light in having wavelengths in a visible spectrum.

14. The phosphor blend of claim 13, wherein y is in a range from about 4.6 to and including 5.

15. A light source comprising:

(a) a source of gas discharge; and (b) a phosphor blend comprising at least two phosphors, each of said phosphors being selected from one of groups: (1) $(Ba,Sr,Ca)_5(PO_4)_3(F,OH):Eu^{2+}$, $(Sr,Ca)MgAl_{10}O_{17}:Eu^{2+}$, and $(Ba,Sr,Ca)BPO_5:Eu^{2+}$; (2) $BaTiP_2O_8$, $(Sr,Ca)MgAl_{10}O_{17}:Eu^{2+}$, and $(Ba,Sr,Ca)_5(PO_4)_3(Cl,F,OH):Sb^{3+}$; (3) $GdMgB_5O_{10}:Tb^{3+}$, (4) $(LuLa,Gd)_x(Al,Ga)_yO_{12}:Ce^{3+}$. $(Tb,Y,LuLa,Gd)_xGa^yO_{12}:Ce^{3+}$ and $(Ba_5(PO_4)_3(F,OH):Mn^{2+}$, $Sb^{3+}$. and $(Ba,Sr,Ca)^5(PO_4)_3(F,OH):Eu^{2+}$ and $(Ba)_5(PO_4)_3(Cl,F,OH):Mn^{2+}$, $Sb^{3+}$; and (5) $(Gd,La,Lu,Sc)_2O_3:Eu^{3+}$, $(Y,Gd,La,In,Lu,Sc)BO_3:Eu^{3+}$, $(Y,Gd,La)(Al,Ga)O_3:Eu^{3+}$, $(Ba,Sr,Ca)(Y,Gd,La,Lu)_2O_4:Eu^{3+}$, $(Y,Gd)Al_3B_4O_{12}:Eu^{3+}$, $(Gd,Y)_4(Al,Ga)_2O_9:Eu^{3+}$ and $(Ca,Sr)(Gd,Y)_3(Ge,Si)Al_3O_9:Eu^3$; wherein x is in a range from about 2.8 to and including 3, y is in a range from about 4 to and including 5, at least two phosphors are selected from different groups, at least one phosphor is selected from group (5), and said phosphor blend is capable of absorbing EM radiation that is emitted by said source of gas discharge and has wavelengths in a range from about 200 nm to about 400 nm and emitting light in having wavelengths in a visible spectrum.

16. The light source of claim 15, wherein y is in a range from about 4.6 to and including 5.

17. A light source comprising:
(a) a source of gas discharge; and
(b) phosphor blend comprising phosphors, each of said phosphors being selected from one of groups: (1) $(Ba,Sr,Ca)_5(PO_4)_3(F,OH):Eu^{2+}$, $(Sr,Ca)MgAl_{10}O_{17}:Eu^{2+}$, and $(Ba,Sr,Ca)BPO_5:Eu^{2+}$; (2) $(Lu,La,Gd)_x(Al,Ga)_yO_{12}:Ce^{3+}$, $(Tb,Y,Lu,La,Gd)Ga_yO_{12}:Ce^{3+}$, $(Ba,Sr,Ca)_5(PO_4)(F,OH):Eu^{2+}$, $Ba_5(PO_4)_3(Cl,F,OH):Mn^{2+},Sb^{3+}$; and (3) $(La,Lu,Sc)_2O_3:Eu^{3+}$, $(Y,Gd,La,In,Lu,Sc)BO_3:Eu^{3+}$, $(Y,Gd,La)(Al,Ga)O_3:Eu^{3+}$, $(Ba,Sr,Ca)(Y,Gd,La,Lu)_2O_4:Eu^{3+}$, $(Y,Gd)Al_3B_4O_{12}:Eu^{3+}$, $(Gd,Y)_4(Al,Ga)_2O^9:Eu^{3+}$ and $(Ca,Sr)(Gd,Y)_3(Ge,Si)Al_3O_9:Eu^3$, wherein x is in a range from about 2.8 to and including 3, y is in a range from about 4 to and including 5, at least two phosphors are selected from different groups, at least one phosphor is selected from group (3), and said phosphor blend is capable of absorbing EM radiation having wavelengths in a range from about 200 nm to about 400 nm and emitting light in having wavelengths in a visible spectrum.

18. The light source of claim 17, wherein y is in a range from about 4.6 to and including 5.

* * * * *

UNITED STATES PATENT AND TRADEMARK OFFICE
CERTIFICATE OF CORRECTION

PATENT NO. : 7,391,148 B1
APPLICATION NO. : 10/064129
DATED : June 24, 2008
INVENTOR(S) : Anant Achyut Setlur et al.

Figure 13:
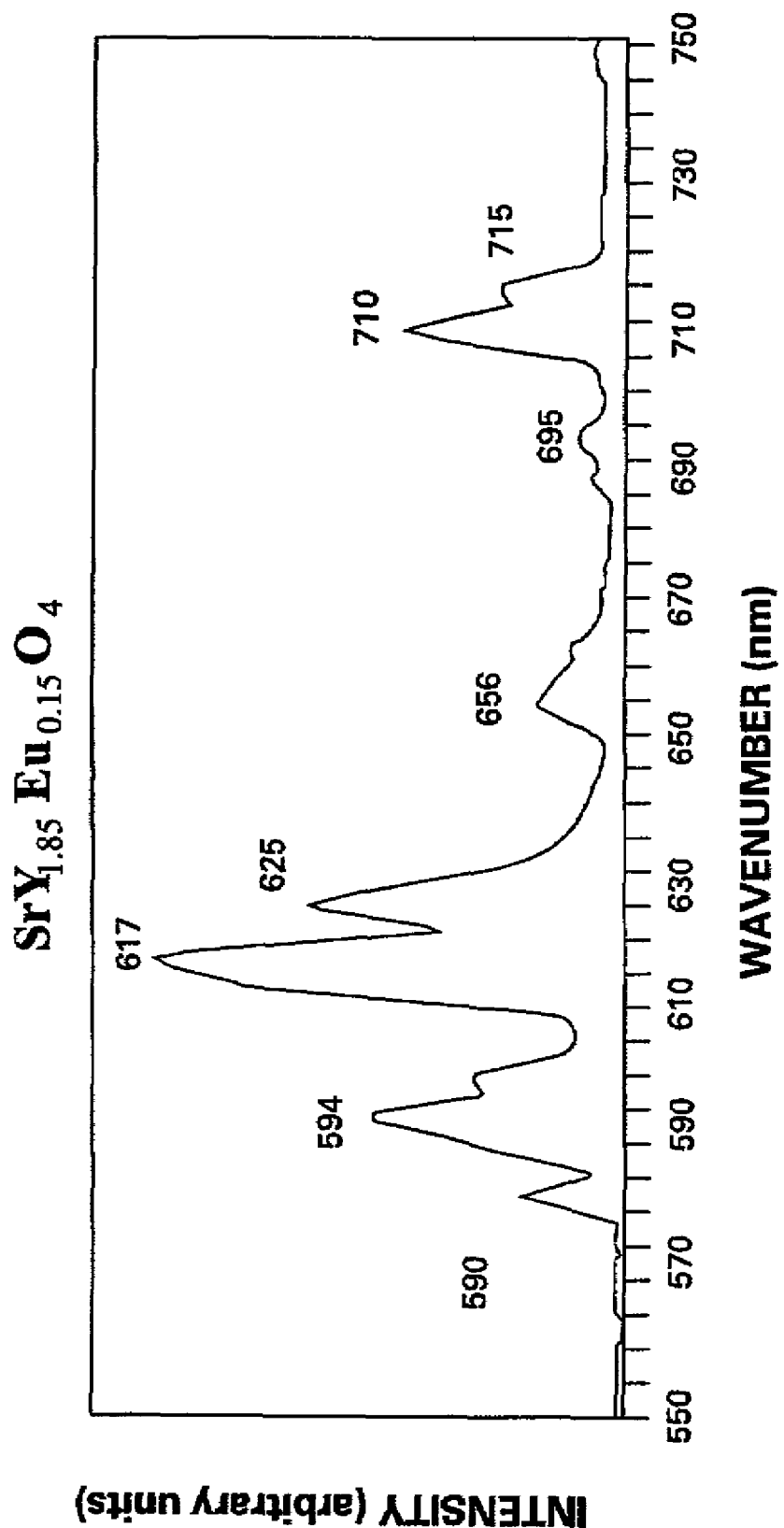
FIG. 13 shows an emission spectrum of $Sr(Y_{1.85}Eu_{0.15})O_4$ under UV excitation at 254 nm.

It is certified that error appears in the above-identified patent and that said Letters Patent is hereby corrected as shown below:

In the Drawings In Figure 13, at the only instance thereof, replace "wavenumber" with -- wavelength --

In the detailed description, column 4, line 43, at the only instance thereof, replace "activated" with -- activator --

In the detailed description, column 4, line 48, at the only instance thereof, replace "in the of" with -- in the ranges of --

In the detailed description, column 4, line 50, at the only instance thereof, replace "while" with -- white --

In claim 1, column 9, line 24, at the only instance thereof, replace "Ma" with -- Mg --

In claim 8, column 9, line 49, at the only instance thereof, replace "mg" with -- Mg --

In claim 8, column 9, line 54, at the only instance thereof, replace "$Ba^5$" with -- $Ba_5$ --

In claim 15, column 10, line 52, at the only instance thereof, replace "$(Sr,Ca)MgAl_{10}O_{17}:Eu^{2+}$" with -- $(Sr,Ca)MgAl_{10}O_{17}:Eu^{2+}, Mn^{2+}$ --

In claim 15, column 10, line 55, at the only instance thereof, replace "$Ga^y$" with -- $Ga_y$ --

In claim 15, column 10, line 56, at the only instance thereof, replace "$(Ba,Sr,Ca)^5(PO_4)_3(F,OH):Eu^{2+}$" with -- $(Ba,Sr,Ca)_5(PO_4)_3(F,OH):Eu^{2+}$ --

UNITED STATES PATENT AND TRADEMARK OFFICE
CERTIFICATE OF CORRECTION

PATENT NO. : 7,391,148 B1
APPLICATION NO. : 10/064129
DATED : June 24, 2008
INVENTOR(S) : Anant Achyut Setlur et al.

It is certified that error appears in the above-identified patent and that said Letters Patent is hereby corrected as shown below:

In claim 15, column 10, lines 60-61, and in claim 17, column 12, line 2, at the only instances thereof, replace "$(Ca,Sr)(Gd,Y)_3(Ge,Si)Al_3O_9:Eu^{3}$" with -- $(Ca,Sr)(Gd,Y)_3(Ge,Si)Al_3O_9:Eu^{3+}$ --.

Signed and Sealed this

Eleventh Day of November, 2008

JON W. DUDAS
*Director of the United States Patent and Trademark Office*